M. L. ROBERTS.
Post-Hole Spade.
No. 68,903.
Patented Sept. 17, 1867.
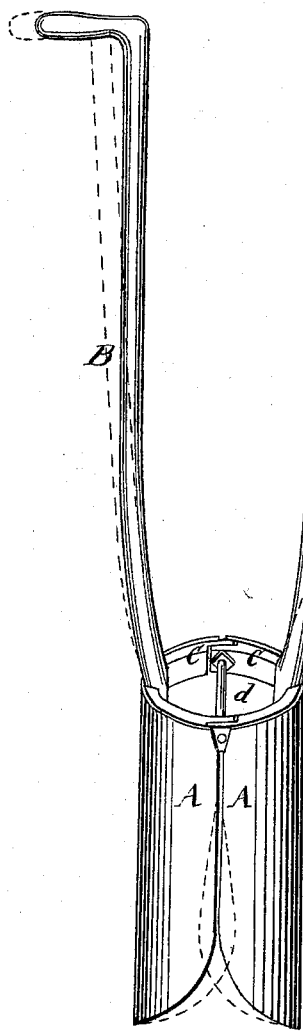
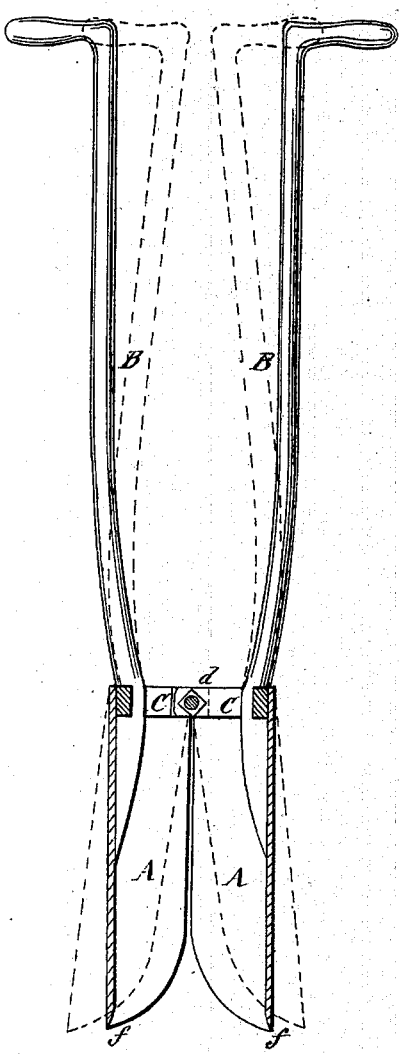
Witnesses:
Jay Hyatt
James Culkins.
Inventor:
M. L. Roberts
by his attys
J. Fraser & Co.

United States Patent Office.

MATTHEW L. ROBERTS, OF SMITHVILLE, CANADA.

Letters Patent No. 68,903, dated September 17, 1867; antedated September 8, 1867.

IMPROVEMENT IN SPADE FOR DIGGING POST-HOLES.

The Schedule referred to in these Letters Patent and making part of the same.

TO ALL WHOM IT MAY CONCERN:

Be it known that I, MATTHEW L. ROBERTS, now residing at Smithville, in the county of Lincoln, and Province of Canada, have invented a new and improved Instrument or Spade for Digging Post-Holes, &c.; and I do hereby declare that the following is a full and exact description thereof, reference being had to the accompanying drawings, making part of this specification, in which—

Figure 1 is a perspective view of my improved spade in the position for inserting in the ground.

Figure 2 a vertical section of the same.

Like letters of reference indicate corresponding parts in both figures.

My invention consists in the peculiar combination and arrangement of two blades or scoops, hinged together at their upper corners with the handles of the same, forming an instrument for digging holes in the ground, substantially as hereinafter described.

As represented in the drawings, A A are two semi-cylindrical blades or scoops, provided with handles B B, which may be riveted to the same, or secured in any other suitable manner. The upper ends of these blades A A are fastened in any desirable way to two corresponding segments, C C, of a ring, which are jointed or hinged together at their extremities, so as to form with the attached blades or scoops a cylinder. These segments may be hinged, as represented, by means of a rod, $d$, or in any other suitable method, as desired. The lower ends of these scoops or blades are sharpened by chamfering, as shown at $f f$, fig. 2, so as to easily penetrate the earth. The blades A A may be made of iron or steel, (the latter of which is preferable,) and quite thin, as their cylindrical or curved form renders them more stiff and unyielding. The ring segments C C add great strength and firmness to the blades. They also furnish firm and strong hinge-joints, one on each side, and serve to securely attach the handles, so that there is no breaking away of the sheet metal of the blades by the attachment. Again, they give a much broader and stronger surface to the top of the blades, to enable the operator to force them into the ground by the foot bearing thereon. The handles B B may be made of iron, or wood and iron, as preferred. They are attached to the ring segments and blades at points equidistant from the hinge-joints. The usual form of the blades or scoops is the semi-cylindrical, as represented, such as is required for digging round holes, but where a square, oblong, or other form of hole is required to be dug, the form of the blades may be correspondingly varied.

The operation of my improvement, constructed as above described, is simple and obvious. The blades or scoops, as represented in black lines, are in the position for inserting in the ground, being in the form of a cylinder. After the spade in this position has been forced into the earth, it is turned in the hole (if round) to entirely separate the earth within from the ground around, and the handles are separated, when the lower ends of the scoops are pressed together, they being so constructed that the edges of one blade, in closing, shall one pass outside and the other inside of the corresponding edges of the other scoop, as shown in red lines in fig. 1, and thereby compressing the earth within, so that it will be retained in and removed with the instrument from the hole, when it is then discharged therefrom by closing the handles, as represented in red lines, fig. 2. The same operation is then repeated till the hole has been excavated to the required depth.

My improved spade is more particularly designed for loose soils, but it may be used in any ground that is not very stony and hard.

Its great advantage consists in the ease and rapidity with which the ordinary post or stake-holes, for fences and other similar purposes, may be excavated, and also in the simplicity and durability of its construction.

The special advantages of hinging the blades at their upper ends, by joints on opposite sides, through means of the ring segments, consist, first, in giving that firmness and strength which will enable the blades to withstand the powerful twisting strain when the instrument is turned in the ground; second, in thereby always insuring a size and shape which are always uniform and cannot be varied, since the ring segments or upper ends of the blades do not expand or contract, whereas, if the instrument were jointed above the blades, not only would there be great strain on the handles, but there would be no means of determining and gauging the size of the hole. The handles also have greater leverage thereby.

The advantage of attaching the handles without hinging to or crossing each other lies in the greater convenience in handling, and in using the foot between them, and in better holding the earth between the blades, when raised, by drawing apart the handles, rather than together.

What I claim as my invention, and desire to secure by Letters Patent, is—

The construction and arrangement of the blades A A, hinged together at their upper ends by means of the ring segments C C, and having the handles B B united to them at points equidistant from the joints thereof, the said handles not crossing, substantially in the manner and for the purposes herein specified.

In witness whereof I have hereunto signed my name in the presence of two subscribing witnesses.

MATTHEW L. ROBERTS.

Witnesses:
    JAY HYATT,
    LOUIS JENSA.